(12) United States Patent
Schaefer

(10) Patent No.: US 6,832,908 B2
(45) Date of Patent: Dec. 21, 2004

(54) CLOSING UNIT FOR TOOLS TO BE PRESSED TOGETHER AGAINST OPENING FORCES

(75) Inventor: August Wilhelm Schaefer, Wilnsdorf (DE)

(73) Assignee: AP&T Schäfer Technologie GmbH, Wilnsdorf (DE)

( * ) Notice: Subject to any disclaimer, the term of this patent is extended or adjusted under 35 U.S.C. 154(b) by 311 days.

(21) Appl. No.: 10/100,963

(22) Filed: Mar. 19, 2002

(65) Prior Publication Data
US 2002/0129486 A1 Sep. 19, 2002

(30) Foreign Application Priority Data
Mar. 19, 2001 (DE) .......................... 101 13 224

(51) Int. Cl.[7] .......................... B29C 45/64; B21D 26/02
(52) U.S. Cl. ...................... 425/405.1; 72/61; 425/451.9; 425/595; 425/DIG. 129
(58) Field of Search .......................... 425/405.1, 450.1, 425/451.7, 451.9, 595, DIG. 129; 72/61

(56) References Cited

U.S. PATENT DOCUMENTS

| | | | | |
|---|---|---|---|---|
| 2,115,590 A | * | 4/1938 | Ryder ...................... | 425/451.7 |
| 3,195,186 A | * | 7/1965 | Gauban et al. .......... | 425/451.9 |
| 4,519,230 A | * | 5/1985 | Chachin et al. ................. | 72/62 |
| 5,375,991 A | * | 12/1994 | Rydmann et al. ........ | 425/451.9 |
| 6,041,633 A | * | 3/2000 | Bieling .......................... | 72/61 |
| 6,113,382 A | * | 9/2000 | McNally .................. | 425/405.1 |

FOREIGN PATENT DOCUMENTS

| | | | |
|---|---|---|---|
| DE | 1602475 | | 2/1970 |
| DE | 2346632 | * | 4/1974 |
| DE | 2302804 | | 8/1974 |
| DE | 19602490 | | 7/1997 |
| DE | 19712128 | | 9/1998 |
| DE | 19834471 | | 2/1999 |
| EP | 420098 | * | 4/1991 |
| FR | 1543113 | | 10/1968 |
| FR | 1564985 | * | 4/1969 |
| FR | 2191982 | | 2/1974 |
| GB | 1393534 | | 5/1975 |
| JP | 54/093053 | | 7/1979 |
| WO | WO01/21378 | | 3/2001 |

* cited by examiner

Primary Examiner—James P. Mackey
(74) Attorney, Agent, or Firm—Dilworth & Barrese LLP

(57) ABSTRACT

The invention relates to a closing unit for tools to be pressed together against opening forces having two tool carriers which can be displaced towards one another. In accordance with the invention, there are two jaws engaging over the tool carrier plates at the side in each case in a closed position while building up a bias. The closing unit is advantageously designed in the form of bias modules for tools.

15 Claims, 5 Drawing Sheets

CLOSING UNIT FOR TOOLS TO BE PRESSED TOGETHER AGAINST OPENING FORCES

BACKGROUND OF THE INVENTION

The invention relates to a closing unit for tools to be pressed together against opening forces having two tool carrier plates which can be displaced towards one another.

Such closing units are used in the area of reshaping technology in which the divided tool has to be kept closed against opening forces. Such opening forces which are exerted on the closed tool arise, for example, during the plastic moulding or during the internal high pressure reshaping of tubes to form hollow bodies in a desired shape.

These closing units usually consist of presses which have to comprise very large closing forces in particular in internal high pressure reshaping. For instance, presses are used in production in automobile technology, for example, for elongate hollow bodies which are manufactured via internal high pressure reshaping, which have a closing force of up to 16,000 tonnes. Such presses can have an overall height of up to 14 meters. In addition, they are expensive to purchase and to service.

SUMMARY OF THE INVENTION

It is the object of the invention to provide a closing unit of the desired kind for tools to be pressed together against opening forces which is of a simple design and an overall small size.

This object is satisfied in accordance with the invention by a closing unit of the desired kind having the features herein. Accordingly, a closing unit for tools to be pressed together against opening forces having two tool carrier plates which can be displaced towards one another has two jaws engaging over the tool carrier plates at the side in each case in a closed position while building up a bias.

A completely new concept is pursued with the present invention. Whereas, up to now, closing units for the pressing together of tools against opening forces were as a rule realised by pressing with very high closing forces, the closing unit in accordance with the invention utilises the basic idea that the forces are generally applied by rigid jaws which are pushed while building up a bias via holding regions of the tool carrier plates in the closed position, that is in the position the tools have to be held together. Since the high pressing forces no longer have to be applied, the construction size of the closing unit, and thus naturally also the total investment volume for the purchase of a corresponding closing unit can be dramatically reduced.

Advantageous aspects of the invention result from the disclosure herein.

The closing unit can be designed particularly advantageously in modular form. That is, it consists of modules of the same design which can be connected to one another, with one module consisting in each case of a base plate, two tool carrier plates which can be displaced towards one another by means of piston in cylinder arrangements and in each case two jaws which can be displaced with respect to the tool carrier plates by two piston in cylinder arrangements. The modular design makes it possible to exactly adjust the closing force of the unit to the application. For instance, a corresponding module of the closing unit can have a bias force of more than 2,000 tonnes per running meter. Depending on the length of the component to be manufactured, a corresponding number of modules can then be coupled to one another. This has a substantial advantage over the closing units designed as presses as these generally have to be designed in accordance with the longest tools to be taken up and so can be oversized for a number of applications. In contrast to this, the closing unit in accordance with the invention can always be matched to the application with a modular design.

The jaws are advantageously formed in a U shape, with the limbs being able to be travelled out to build up the bias on the movement towards the tool carrier plate and on the engaging over of the tool carrier plates at the side onto wedges extending at an incline. The required bias, with which the tool parts are pressed together over the tool carrying plates carrying these, can here be applied by a correspondingly lateral displacement by comparatively small-sized piston in cylinder arrangements.

The wedges arranged at the tool carrier plates can consist of a separately replaceable component made of an abrasion-resistant material. These are wear parts which can accordingly be easily replaced.

At the same time, the contact surface inside the limbs of the jaws can likewise consist of replaceable parts made of an abrasion-resistant material, with the contact surfaces on the jaw side being made of rails approximately semi-circular in cross-section, with these semi-circular rails being mounted in correspondingly semi-circular grooves within the jaws.

In accordance with a preferred embodiment, a lower tool carrier plate can be fixedly secured to the base plate, while an upper tool carrier plate can be travelled over four symmetrically arranged piston in cylinder arrangements, with the piston in cylinder arrangements being likewise secured to the base plate at the one end and to corresponding crossbeams, in which the upper tool carrier plate is received, at the other end. The upper tool carrier plate can be travelled over the four symmetrically arranged piston in cylinder arrangements in a perpendicular manner with respect to the lower tool carrier plate.

In accordance with one embodiment, the jaws can be displaceably guided over bearings on the base plate, with these being movable with respect to the tool carrier plates via piston in cylinder arrangements connected to the lower tool carrier plate at the one end and via piston in cylinder arrangements which can be coupled into the upper tool carrier plate when this is lowered at the other end.

Alternatively to this, in another variant, the jaws can be displaceable with respect to the tool carrier plates via at least one piston in cylinder unit which is mounted in a bearing block arranged on the base plate.

One or two bias membrane(s) which can be acted on by hydraulic fluid can be arranged between the tool carrier plate and the part of the tool fixedly clamped in the tool carrier plate in order to apply the corresponding closing force, with delivery openings for the hydraulic fluid being provided inside the tool carrier plate such that on the pressing in of hydraulic fluid, the membrane is deformed in the direction towards the clamped work part and thus additionally works against the opening forces.

BRIEF DESCRIPTION OF THE DRAWINGS

Further details and advantages of the invention will be described in more detail with reference to an embodiment represented in the drawing. There are shown.

DESCRIPTION OF THE PREFERRED EMBODIMENTS

Figure 1:
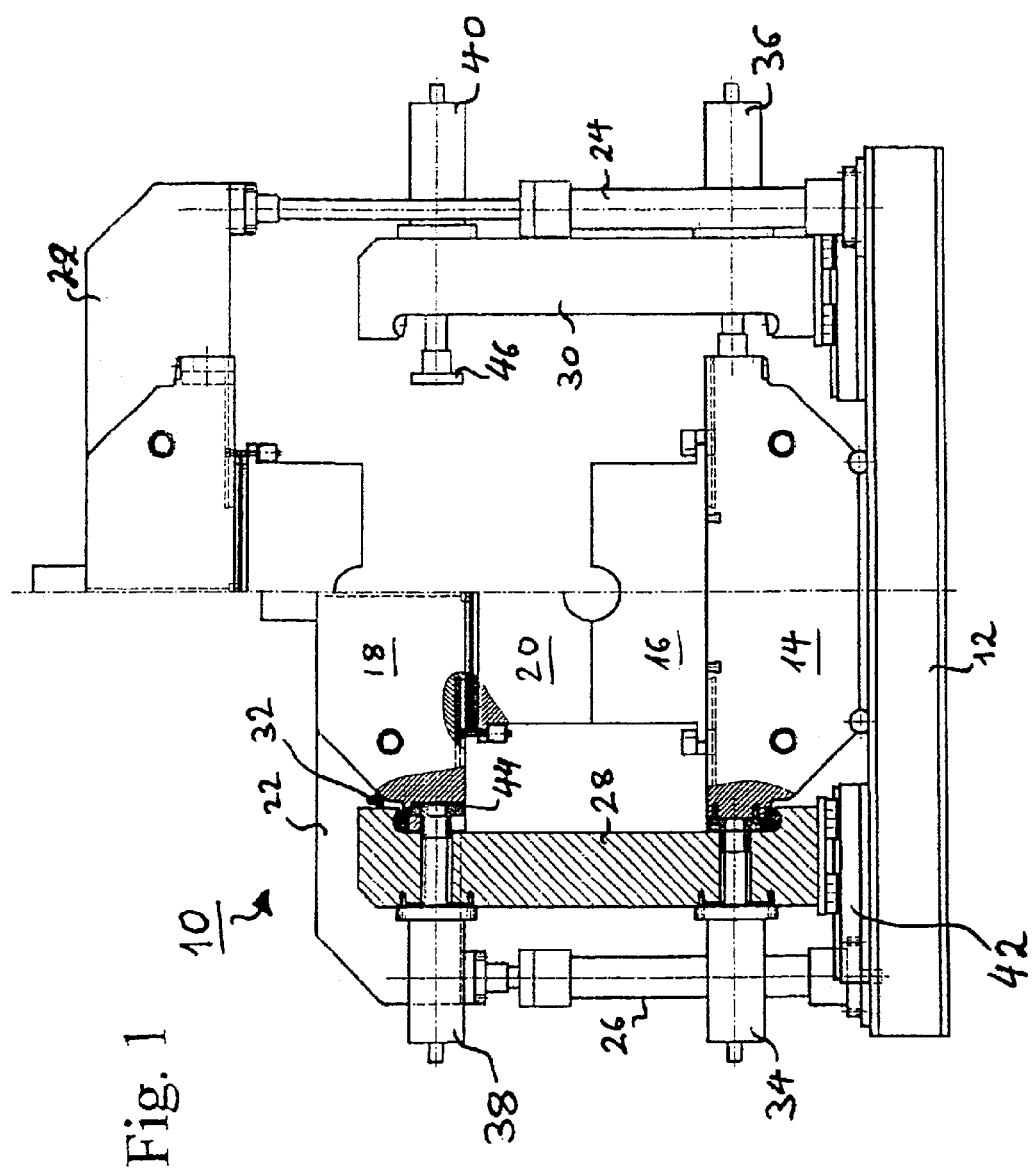
FIG. 1: a partly sectioned plan view of a closing unit in accordance with an embodiment of the present invention.

A closing unit 10 is shown in FIG. 1 in the closed position in the left hand half and in the open position in the right hand half. The closing unit 10 comprises a tool carrier plate 14 mounted in a fixed position on a base plate 12 and having a tool half 16 clamped in and a tool carrier plate 18 displaceable with respect to the fixed position tool carrier plate 14 and having a received tool half 20. The tool carrier plate 18 is held in crossbeams 22 which are in turn movable via piston in cylinder arrangements 24, 26 in the direction towards the lower tool carrier plate 14. The piston in cylinder arrangements 24 and 26 are connected to the base plate 12 at the one end and to the respective cross beams 22 at the other end.

The closing unit 10 furthermore has laterally travellable jaws 28, 30 which are substantially designed in a U shape and whose limbs are displaceable via holding regions 32 formed in a step-like manner at the tool carrier plates. The jaws 28 and 30 respectively can be displaced with respect to the tool carrier plates 14, 18 via piston in cylinder arrangements 34, 36 or 38, 40 respectively. As shown in FIG. 1, the pistons 34 and 36 are laterally screwed to the tool carrier plate 14, while the cylinders for their part are screwed to the jaws. The pistons pass through the jaws through a corresponding bore. On one side, the jaws 28 or 24 are slidingly mounted on a plain bearing 42 which is mounted on the base plate 12.

Figure 2:
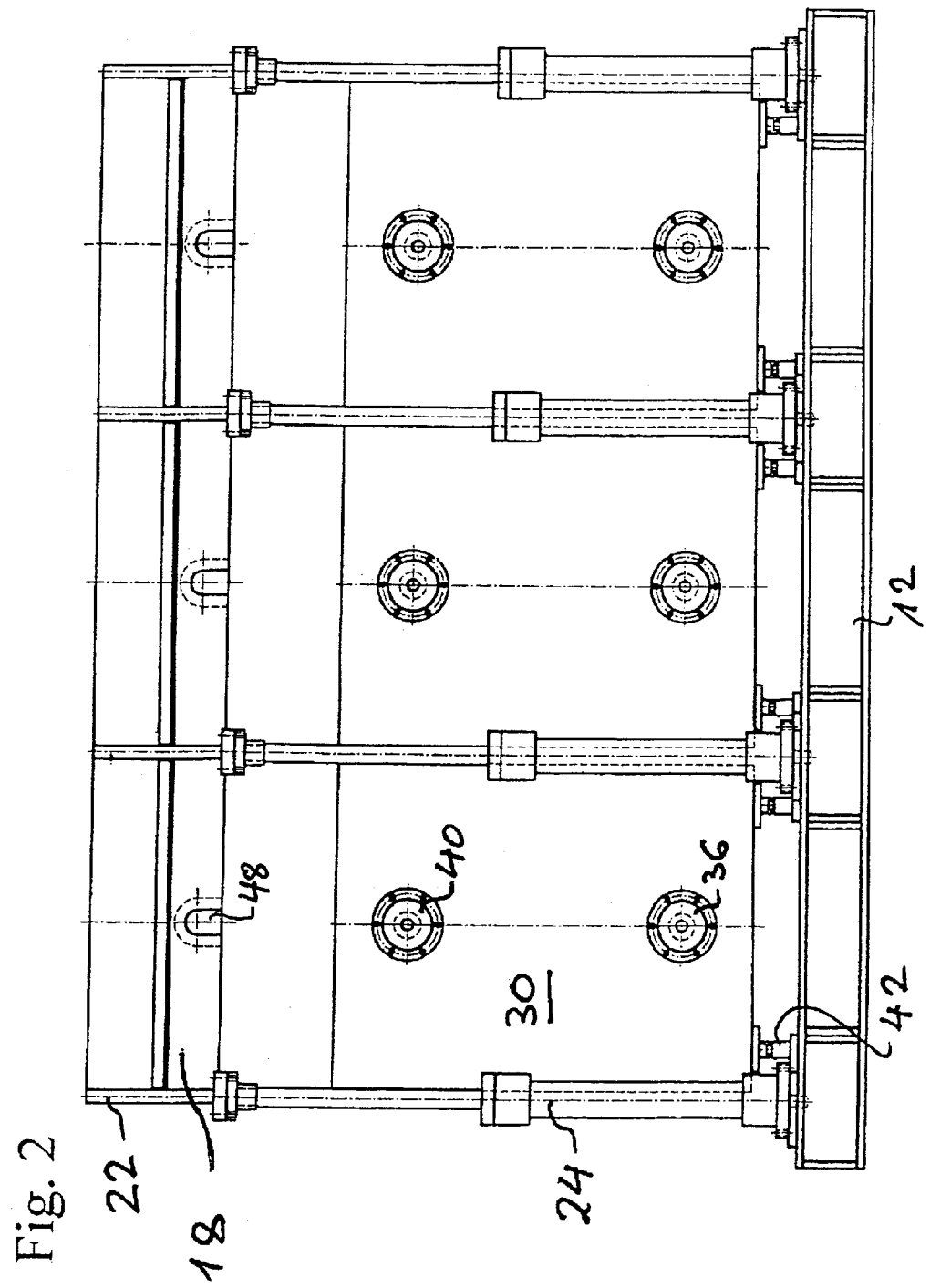
FIG. 2: a side view of the closing unit in accordance with FIG. 1.

The piston in cylinder arrangements 38 and 40 are arranged parallel to the piston in cylinder arrangements 34 and 36. The pistons are here each connected to the jaws 28 or 30. In contrast, the cylinders have a closing flange 44 or 46 which can be travelled into a corresponding slit 48 inside the tool carrier plate (cf. FIG. 2). As shown in the left hand part of FIG. 1, the flange 44 or 46 dips into the corresponding recess behind the elongate hole 48 when the tool carrier plate 18 is lowered and results in a coupling of the piston in cylinder arrangement to the tool carrier plate 18. The jaws 28 or 30 can thus be pushed over the holding regions 32 in the closed position of the closing unit 10 by actuating the piston in cylinder arrangements 34, 36, 38 and 40.

Figure 3:
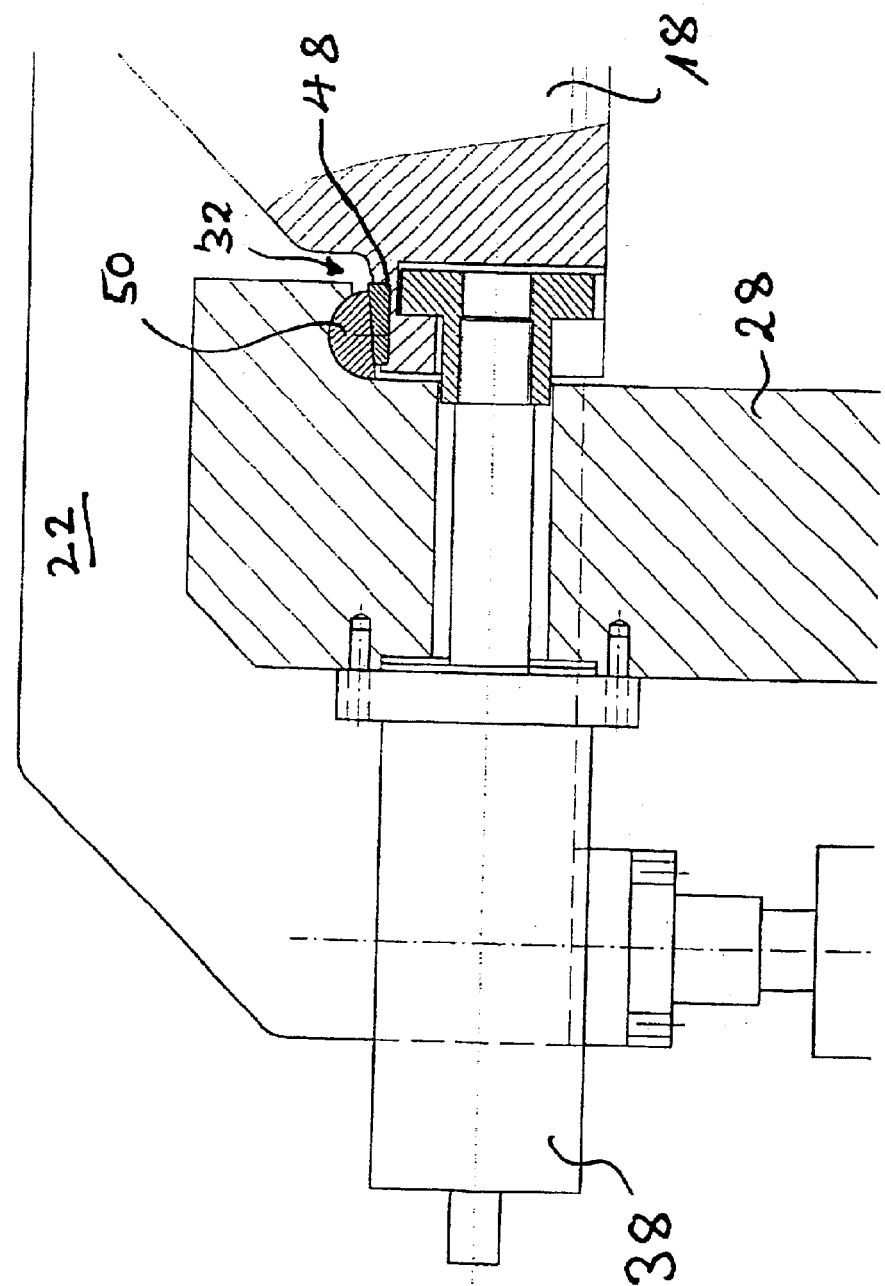
FIG. 3: a partly sectioned detail from FIG. 1.
Figure 4:
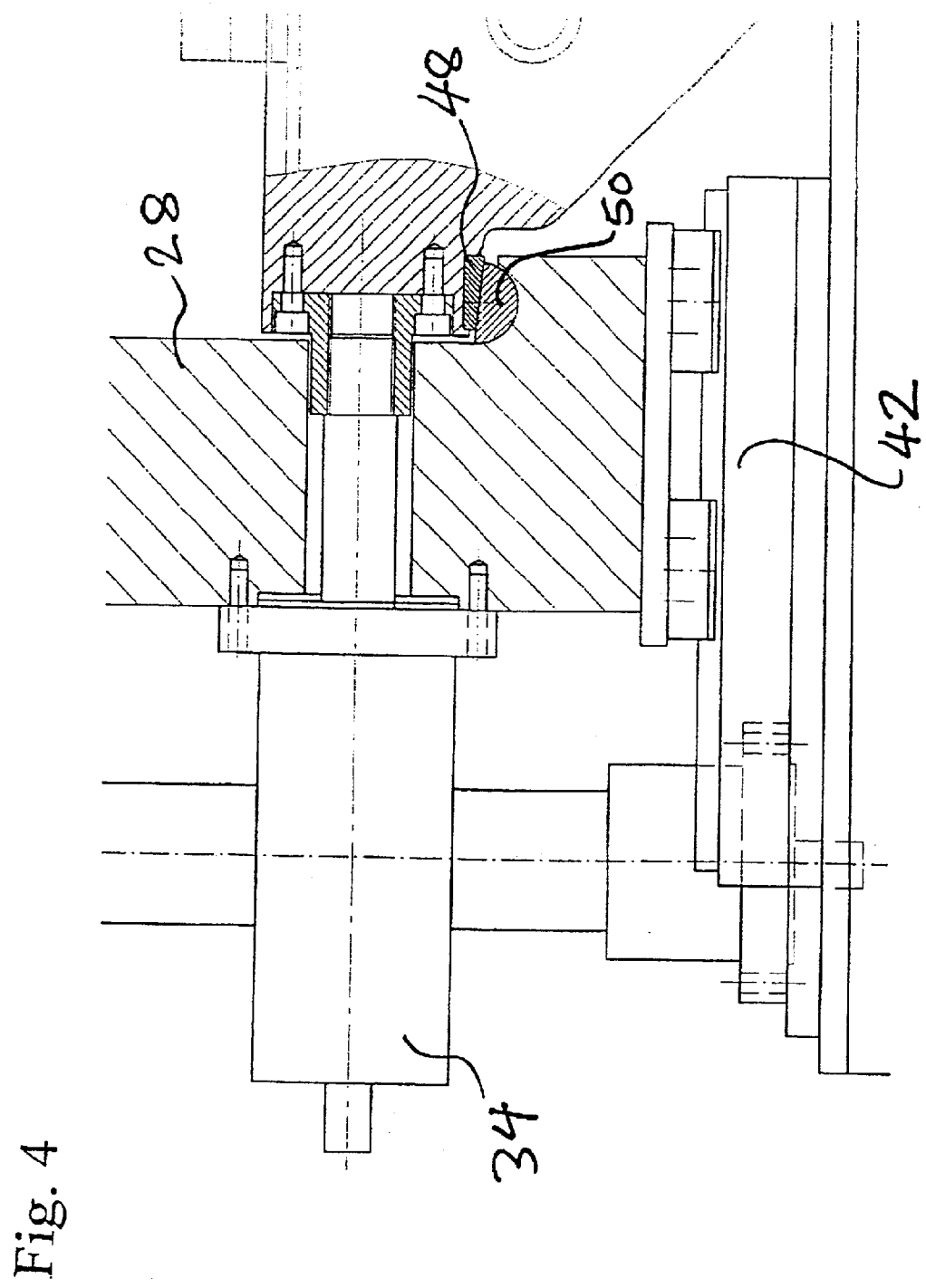
FIG. 4: a second partly sectioned detail from FIG. 1.

In particular in FIG. 3, it is shown in a detailed view that when the jaws are pushed on, here the jaw 28, the free limbs run on to a wedge-shaped surface. The wedge-shaped surface is formed in the holding region 32 of the tool carrier plate 18 by an inserted wedge 48 made of an abrasion-resistant material, while the opposite slide surface is likewise formed within the jaw 28 by means of a rail 50 which consists of abrasion-resistant material, with the rail 50 being formed in semi-circular manner in cross-section and being mounted in a correspondingly semi-circular recess of the jaw 28. The contact surface of the rail 50 can thus adapt to the incline of the contact wedge 48. A high bias is exerted onto the tool halves 16 and 20 via the closed tool carrier plates by pushing over the engaging jaws. In FIG. 4, the lower part of the jaw 26 is pushed onto the tool carrier plate 14 in section, with corresponding wedges 48 or rails 50 also being provided.

Figure 5:
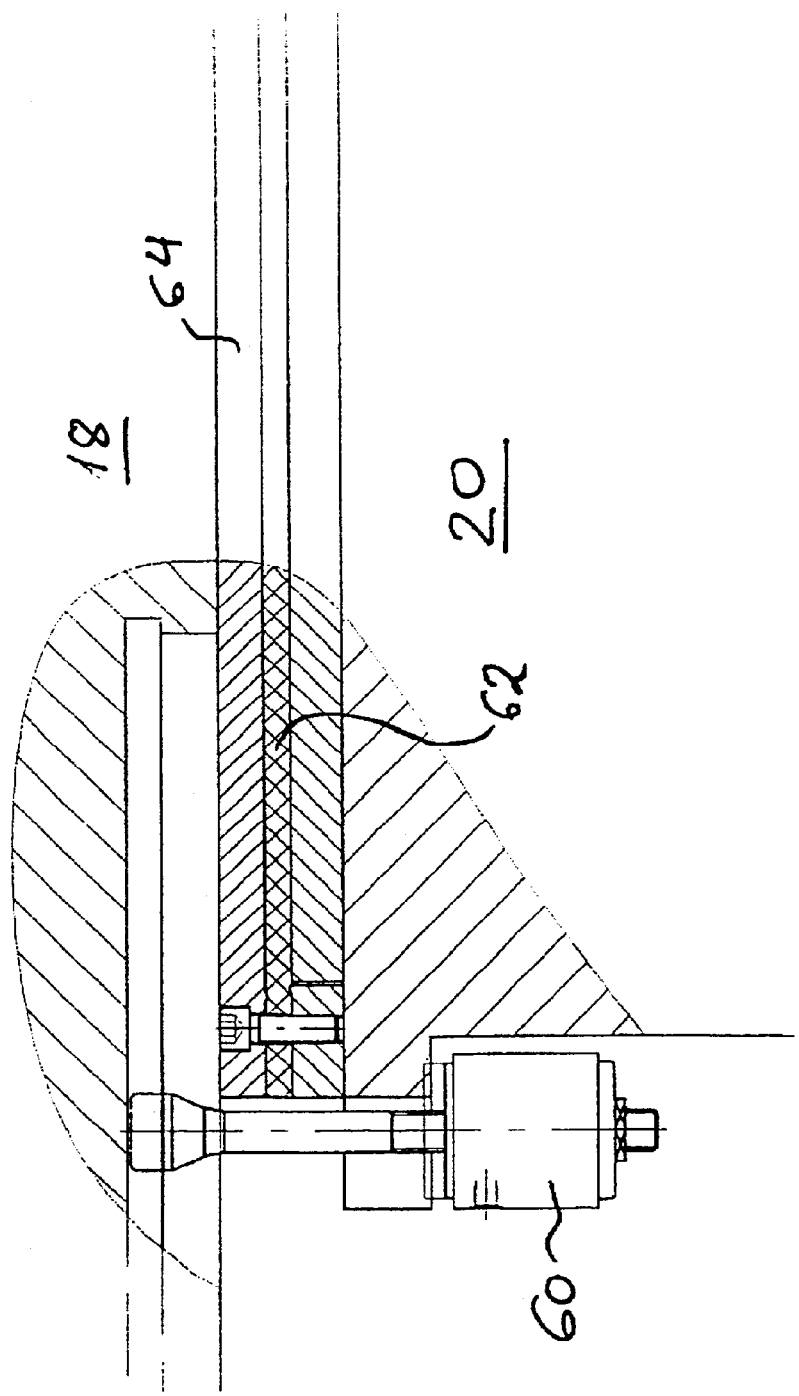
FIG. 5 a third partly sectioned detail from FIG. 1.

In FIG. 5, a detail, partly sectioned, is shown of the transition between the tool carrier plate 18 and the tool half 20, with this sectioned region corresponding to that in accordance with FIG. 1, but shown in enlarged form in FIG. 5. First, a clamp element 60 is shown at the side via which the tool half 20 can be clamped in the tool carrier plate 18. However, a rubber layer 62 which is arranged between the tool carrier plate 18 and the tool half 20 and which forms a bias membrane is of special importance here. Openings are provided in a manner not shown in more detail in the tool carrier plate 18 via which hydraulic fluid can be pumped between the bias membrane 62 and a contact plate 64 such that the pressed in hydraulic fluid acts on the membrane in the direction of the clamped tool half 20 such that a force is additionally applied to the tool piece half which acts against the opening force in the tool.

The embodiment unit shown in the example discussed here is built up of a plurality of modules which are connected to one another. As results from the representation in accordance with FIG. 2, three modules built up symmetrically to one another are here built up next to-one another on a base plate 12. The tool 16, 20 can be adapted in accordance with the length due to the modular construction.

What is claimed is:

1. A closing unit for tools to be pressed together against opening forces, having two tool carrier plates which can be displaced towards one another, and two jaws engaging over the tool carrier plates from a lateral direction to build up bias on the tool, wherein the jaws are displaceably guided over bearings on a base plate and being moveable with respect to the tool carrier plates via piston in cylinder arrangements connected to a lower tool carrier plate and via piston in cylinder arrangements which can be coupled into an upper tool carrier plate when lowered.

2. A closing unit in accordance with claim 1, composed of modules of the same design and connectable to one another, with each module composed of a base plate, two tool carrier plates displaceable towards one another by piston in cylinder arrangements and two jaws displaceable with respect to the tool carrier plates by piston in cylinder arrangements.

3. A closing unit in accordance with claim 1, wherein the jaws are formed in a U shape, with limbs being able to build up bias on movement towards the tool carrier plates and engaging over the tool carrier plates onto wedges arranged on a side of each tool carrier plate.

4. A closing unit in accordance with claim 3, wherein the wedges each comprise a separately replaceable component made of abrasion-resistant material.

5. A closing unit in accordance with claim 1, wherein at least one bias membrane which can be acted on by hydraulic fluid is arranged between one of the tool carrier plates and a part of the tool fixedly clamped in the adjacent tool carrier plate, with delivery openings for the hydraulic fluid being provided within the adjacent tool carrier plate such that on pressing in of hydraulic fluids, the membrane is deformed in a direction towards the clamped part and thus additionally works against opening forces in the tool.

6. A closing unit in accordance with claim 2, wherein the jaws are formed in a U shape, with limbs being able to build up bias on movement towards the tool carrier plates engaging over the tool carrier plates onto wedges arranged on a side of each tool carrier plate.

7. A closing unit in accordance with claim 6, wherein the wedges each comprise a separately replaceable component made of abrasion-resistant material.

8. A closing unit in accordance with claim 2, wherein at least one bias membrane which can be acted on by hydraulic fluid is arranged between one of the tool carrier plates and a part of the tool fixedly clamped in the adjacent tool carrier plate, with delivery openings for the hydraulic fluid being provided within the adjacent tool carrier plate such that on pressing in of hydraulic fluids, the membrane is deformed in a direction towards the clamped part and thus additionally works against opening forces in the tool.

9. A closing unit in accordance with claim 3, wherein at least one bias membrane which can be acted on by hydraulic fluid is arranged between one of the tool carrier plates and a part of the tool fixedly clamped in the adjacent tool carrier plate, with delivery openings for the hydraulic fluid being provided within the adjacent tool carrier plate such that on pressing in of hydraulic fluid, the membrane is deformed in a direction towards the clamped part and thus additionally works against opening forces in the tool.

10. A closing unit for tools to be pressed together against opening forces, having
two tool carrier plates which can be displaced towards one another, and
two jaws engaging over the tool carrier plates from a lateral direction to build up bias on the tool, wherein
a contact surface within limbs of the jaws is composed of rails of abrasion-resistant material which are approximately semi-circular in cross-section.

11. A closing unit in accordance with claim 10, wherein a lower tool carrier plate is fixedly secured to a base plate and an upper tool carrier plate can be travelled perpendicular to the fixedly arranged tool carrier plate via four symmetrically arranged piston in cylinder arrangements.

12. A closing unit in accordance with claim 10, wherein the jaws are displaceable with respect to the tool carrier plates via at least one piston in cylinder unit which is mounted in a bearing block arranged on a base plate.

13. A closing unit in accordance with claim 10, wherein the jaws are displaceably guided over bearings on a base plate and being moveable with respect to the tool carrier plates via piston in cylinder arrangements connected to a lower tool carrier plate and via piston in cylinder arrangements which can be coupled into an upper tool carrier plate when lowered.

14. A closing unit in accordance with claim 11, wherein the jaws are displaceably guided over bearings on the base plate and being moveable with respect to the tool carrier plates via piston in cylinder arrangements connected to the lower tool carrier plate and via piston in cylinder arrangements which can be coupled into the upper tool carrier plate when lowered.

15. A closing unit in accordance with claim 10, wherein at least one bias membrane which can be acted on by hydraulic fluid is arranged between one of the tool carrier plates and a part of the tool fixedly clamped in the adjacent tool carrier plate, with delivery openings for the hydraulic fluid being provided within the adjacent tool carrier plate such that on pressing in of hydraulic fluid, the membrane is deformed in a direction towards the clamped part and thus additionally works against opening forces in the tool.

* * * * *